July 31, 1956 E. H. GATZERT 2,757,240
GATING CIRCUIT FOR LINES INCOMING
TO AN OPERATOR'S POSITION
Filed Dec. 21, 1954 3 Sheets-Sheet 1

INVENTOR.
ERNEST H. GATZERT
BY F. H. Henson
AGENT

INVENTOR.
ERNEST H. GATZERT
BY F. H. Henson
AGENT

July 31, 1956 E. H. GATZERT 2,757,240
GATING CIRCUIT FOR LINES INCOMING
TO AN OPERATOR'S POSITION
Filed Dec. 21, 1954 3 Sheets-Sheet 3

INVENTOR.
ERNEST H. GATZERT
BY F. H. Henson
AGENT 2,757,240

GATING CIRCUIT FOR LINES INCOMING TO AN OPERATOR'S POSITION

Ernest H. Gatzert, Rochester, N. Y., assignor, by mesne assignments, to General Dynamics Corporation, a corporation of Delaware Application December 21, 1954, Serial No. 476,689

5 Claims. (Cl. 179—27)

This invention relates to telephone systems, and more particularly to gating circuits for lines or trunks incoming to an operator's position.

In main dial offices, private branch exchanges, or any other exchange comprising an operator's position, several types of trunks extend from the banks of the automatic switching equipment to the operator's position. For example, in a main dial office there may be a group of local information trunks, a group of service trunks, and a group of combined line and recording or long distance trunks accessible to local subscribers. Each group of trunks terminates in a separate level of a special second selector and the trunks of each group extend to the toll board. Also, an auxiliary intertoll selector is usually provided in the main dial office and toll information, inward operator, and TX or toll delay operator trunks extend from different levels of its banks to the toll board. Also, special types of subscribers' lines, such as rural lines, manual paystation lines, etc., may terminate at the toll board.

In small offices, each trunk or line has a jack and lamp appearance at each position of the toll board. In particularly busy trunk groups, there may be undue delay in answering a call incoming on a particular trunk since the operators have no way of determining in what order calls were initiated. Since the incoming lamps of all unanswered trunks are illuminated, and since newly initiated calls may appear as fast or faster than the operators can answer previously initiated calls, it may happen that calls on some trunks may remain unanswered indefinitely.

Accordingly, it is the general object of this invention to provide new and improved apparatus for enabling operators to answer calls in the approximate order in which the calls are initiated.

It is a further object of this invention to provide a flexible and economical gating circuit for lines or trunks incoming to an operator's position.

Briefly, the invention accomplishes the above cited objects by providing a gate adapter circuit for each line or trunk which is to be given the gating feature. The gate adapter circuit delays the illumination of the incoming lamp corresponding to the line associated with that adapter circuit until previously initiated calls on other lines have been answered. In other words, calls initiated while a previously initiated group of calls are being answered are accumulated into a group. When the last line of the previously initiated group is answered, the incoming lamps associated with the accumulated group of lines are illuminated.

Each gate adapter circuit comprises a control relay which has its operating circuit prepared when a call is initiated on its associated line. When the last one of the calls of the previously initiated group is answered, a gate adapter control circuit, which is common to all of the gate adapter circuits, functions to complete the operating circuits of all control relays having previously prepared operating circuits. As soon as the control relays with prepared circuits are operated, the gate adapter control circuit functions to disconnect the circuit gating means so that subsequently initiated calls serve merely to prepare operating circuits for their associated control relays.

A particular advantage of this invention is that it is not necessary to have gating relays in the individual trunk circuits or line circuits. It is the usual practice to terminate the tip, ring, sleeve, and incoming lamp conductors from each trunk circuit at a terminal block and then jumper these terminals to tip, ring, sleeve, and incoming lamp terminals which extend to the operator's position. According to the present invention, it is necessary only to insert a gate adapter circuit between the incoming lamp conductor from the trunk circuit and the incoming lamp conductor to the operator's position to gate the incoming calls. Thus, the gate adapter circuit can be readily used with any existing trunk circuit having an incoming lamp conductor and also, the gate adapter circuits can be readily moved from one group of trunk circuits to another as traffic conditions dictate.

Further objects and advantages of the invention will become apparent as the following description proceeds, and the features of novelty which characterize the invention will be pointed out in particularity in the claims annexed to and forming a part of this specification.

For a better understanding of the invention, reference may be had to the accompanying drawings in which Fig. 1 shows the trunking diagram of the described system, Fig. 2 shows a gate adapter circuit and a gate adapter control circuit, and Fig. 3 shows an incoming trunk circuit and a fragmentary version of an operator's position.

The general operation of the system may best be understood by reference to the trunking diagram of Fig. 1. It can be seen that local information trunk circuits 140 and 150 terminate in individual jacks at operator's position 190 and are accessible to local subscribers through level 3 of special second selector 130. Gate adapter circuits 160 and 170 are individually associated with trunk circuits 140 and 150, respectively, and are individually interposed in connections between the trunk circuits and the incoming lamps associated with those trunk circuits at operator's position 190. For example, it can be seen that gate adapter circuit 160 is connected to trunk circuit 140 by conductor L2 and to the incoming lamp associated with that trunk circuit at operator's position 190 by conductor L3. The gate adapter circuits are controlled by gate adapter control circuit 180 over cable 181, which is multipled to all gate adapter circuits.

While only two local information trunk circuits have been shown, it is to be understood that in actual practice the number of trunk circuits required is controlled by traffic conditions. Also, the gate adapter circuits are shown as associated only with local information trunk circuits. The disclosed arrangement is intended as an example only since many types of trunk circuits may be given the gating feature, as previously mentioned. If it is desired to gate the trunk circuits by groups, it is necessary to supply a gate adapter control circuit for the gate adapter circuits associated with each group of trunks. For example, toll information calls are usually given priority over local information calls so that it would probably be desirable to provide one gate adapter control circuit for the toll information trunks, and a separate gate adapter control circuit for the local information trunks.

When a local station STA1 goes off-hook, line circuit 100 and line finder 110 function to connect local first selector 120 to station 1 in the well known manner. If the subscriber at station 1 desires information, he dials the number "113." The first digit "1" steps selector 120 to its first level, and the selector searches in that level and seizes an idle special second selector, such as 130. The second digit "1" is absorbed by selector 130. It will be noted that level 1 is a dropback level in selector 130, as denoted by the X superimposed on the terminal corresponding to level 1. The third digit "3" steps selector 130 to the third level where it searches for an idle trunk circuit, such as 140. The gate adapter circuit 160 serves to illuminate the incoming lamp associated with trunk circuit 140 at operator's position 190 under control of the gate adapter control circuit 180, as previously described. When the operator answers the call in response to the illumination of the incoming lamp, a talking connection is completed between the operator and the subscriber at station 1.

A detailed description of the system follows.

*Detailed description*

Figure 1:
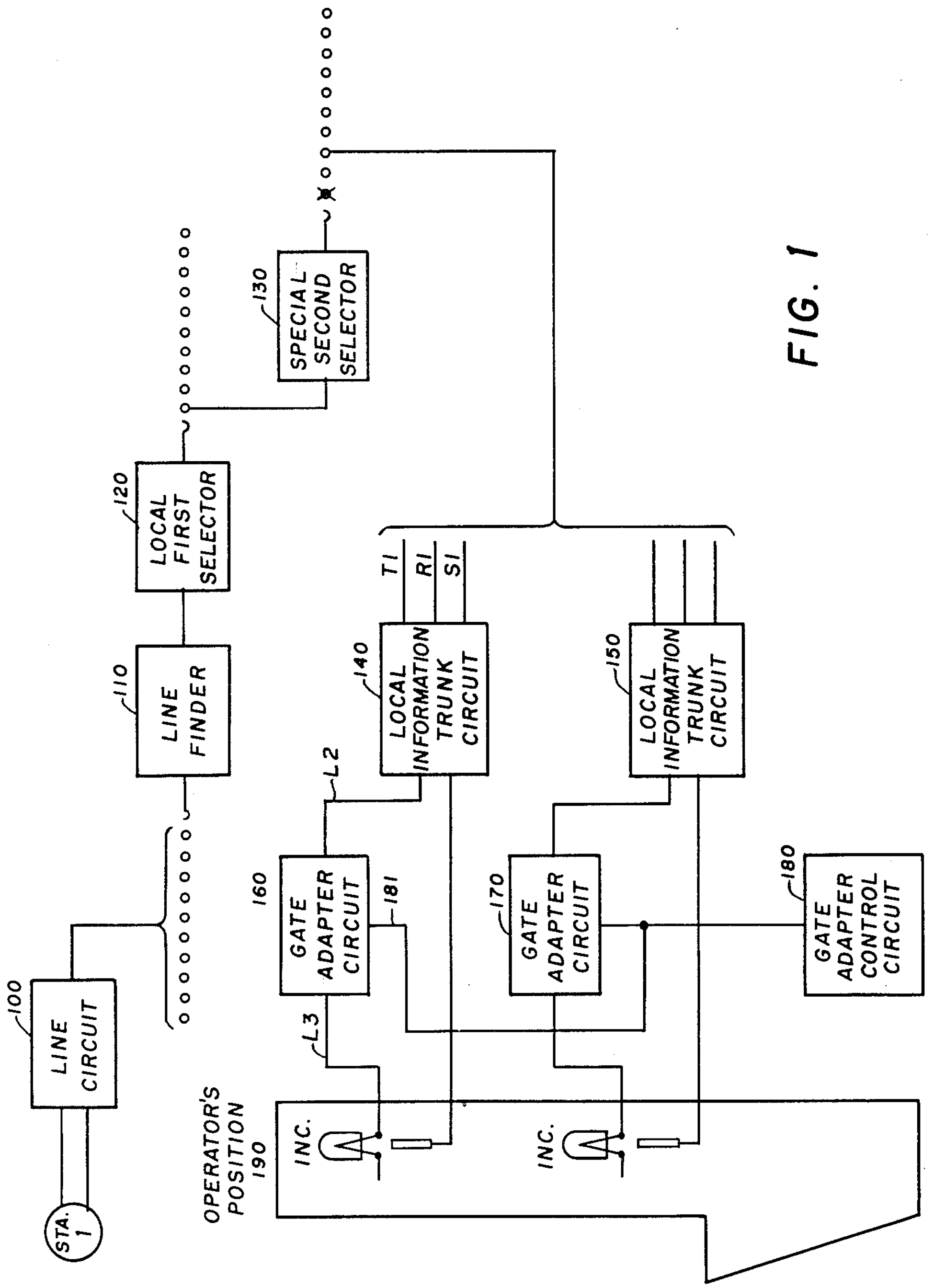
Figure 2:
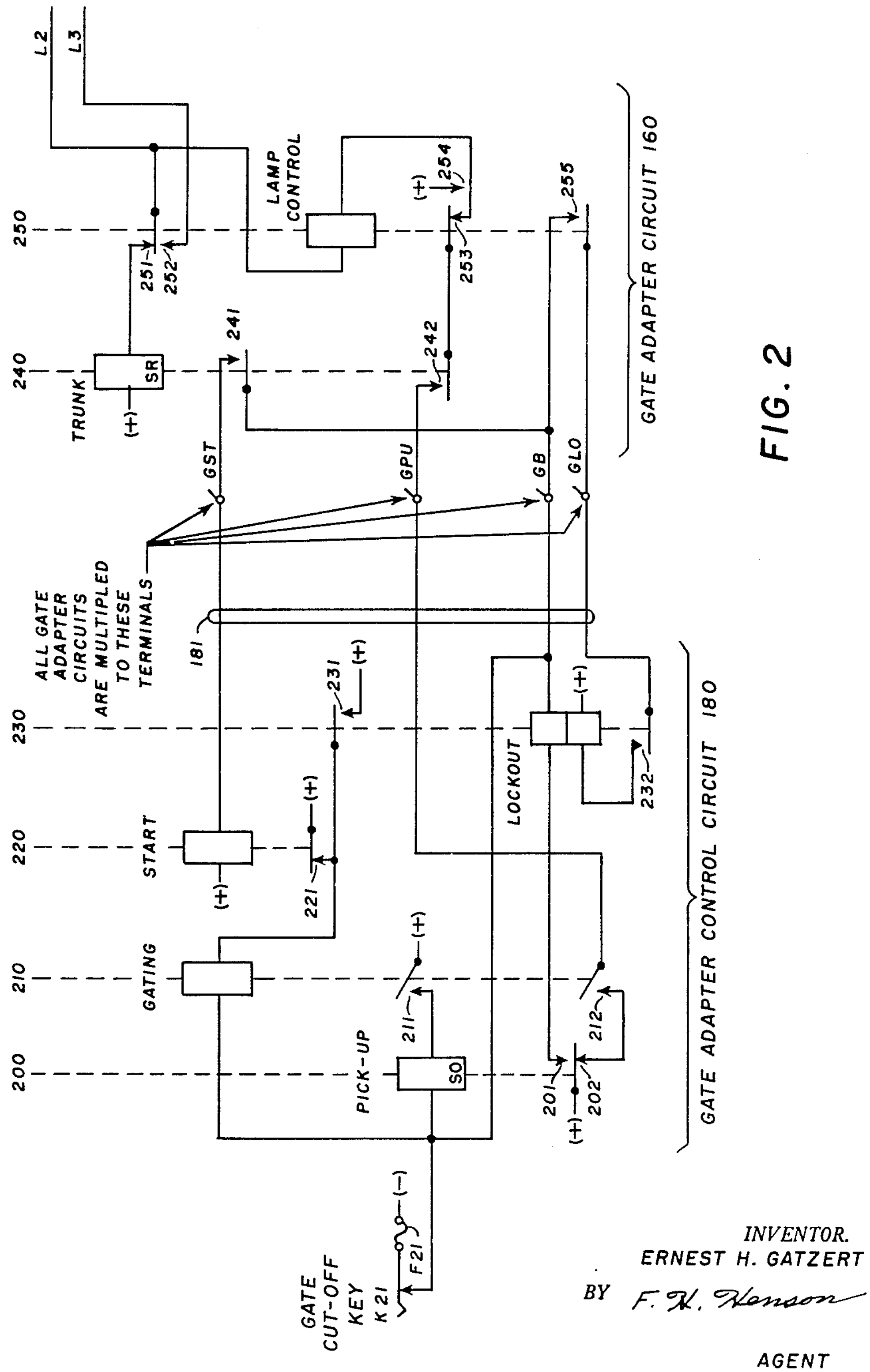
Figure 3:
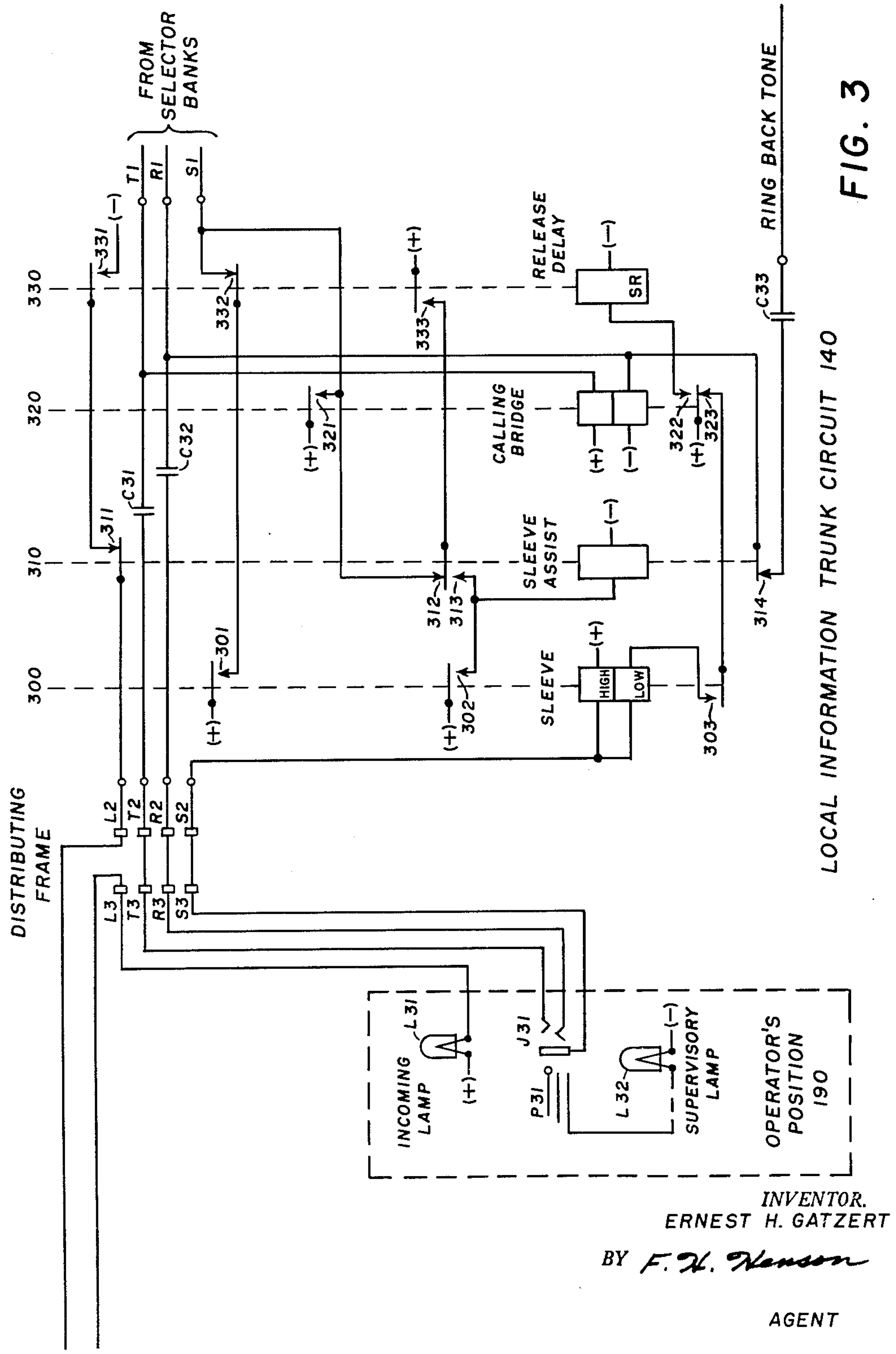

Assume that a local subscriber has dialed the number "113" and that special second selector 130 has switched through to the tip, ring, and sleeve conductors T1, R1, and S1, respectively, of trunk circuit 140. In trunk circuit 140, calling bridge relay 320 operates responsive to seizure over a circuit extending from ground through the upper winding of relay 320, conductor T1 through the loop closed at the calling station, back over ring conductor R1 and through the lower winding of relay 320 to battery. At operated make contacts 321, relay 320 closes ground to sleeve conductor S1 to hold the preceding switches operated in the well known manner. At operated make contacts 322, relay 320 closes an obvious operating circuit for release delay relay 330. It will be noted that ringback tone, through capacitor C33, break contacts 314 on unoperated relay 310, is connected to the ring conductor R1 and is thus heard by the calling subscriber as soon as trunk circuit 140 is seized.

Release delay relay 330, in operating, closes an alternate ground for sleeve conductor S1 at its operated make contacts 333 and through break contacts 312 on unoperated relay 310. This ground is provided to insure that the sleeve will not be dropped even if the calling subscriber should inadvertently dial an extra digit. At operated contacts 331, relay 330 connects battery to conductor L2 through break contacts 311 on unoperated relay 310. The battery on conductor L2 is routed through break contacts 251 on unoperated relay 250 to operate trunk relay 240 in the gate adapter circuit 160. The battery on conductor L2 is also connected to the left terminal of lamp control relay 250 in the gate adapter circuit.

Assume that there are no unanswered calls awaiting the operator's attention. The operation of trunk relay 240 connects battery through fuse F21, key K21, over the common gate battery conductor GB, through operated make contacts 241 on relay 240 to the gate start conductor GST, and through the winding of start relay 220 in the gate adapter control circuit 180 to ground. It is to be noted that conductors GB, GST, GPU, and GLO of cable 181 extend from the gate adapter control circuit to all gate adapter circuits in multiple. Thus, the operation of the trunk relay in any one of the gate adapter circuits functions to connect battery to conductor GST and thus operate the start relay 220. Gating relay 210 is normally operated from ground through break contacts 221 on relay 220, through the winding of relay 210 and through key K21 to battery. The operation of start relay 220 serves to open contacts 221 and thus release gating relay 210.

An operating circuit is now completed for all lamp control relays having prepared operating circuits responsive to the release of relay 210. It will be remembered that battery is connected to the left-hand terminal of lamp control relay 250 responsive to the seizure of trunk circuit 140. An operating circuit for relay 250 is now completed from ground through break contacts 202 on unoperated relay 200, through now normal break contacts 212 on relay 210, over the gate pickup conductor GPU, through operated make contacts 242 on relay 240, through the break portion 253 of a make before break combination on relay 250 to the right-hand winding of relay 250. Lamp control relay 250 and all other lamp control relays having battery connected to their left-hand terminals operate at this time.

At the make portion 254 of the make before break combination, relay 250 closes a locking circuit for itself dependent solely upon the battery potential on conductor L2. At its operated contacts 252, relay 250 connects the battery potential on conductor L2 to conductor L3 and thus through incoming lamp L31 to ground. The operator is thus advised that a call has been initiated on trunk circuit 140.

Returning to the gate adapter control circuit 180, it can be seen that the release of gating relay 210 closes an energizing circuit for the slow to operate pickup relay 200 at now normal contacts 211 on relay 210. After a slight delay, relay 200 operates and at its operated make contacts 201 connects ground through the upper winding of lockout relay 230 to battery on key K21. The operation of relay 200 also serves to remove ground from the gate pickup conductor GPU at contacts 202. Thus calls initiated on lines at this time are not effective to operate the lamp control relay in the adapter circuit associated with that line.

Lockout relay 230, upon operating, closes a hold circuit for itself from ground through its lower winding, through its operated make contacts 232 over conductor GLO, through operated contacts 255 on relay 250 and the operated contacts of all other lamp control relays in multiple, over conductor GB and through key K21 to battery. Thus, relay 230 is locked operated until all operated lamp control relays have been released. At operated contacts 231, relay 230 closes a second operating path for gating relay 210. Relay 210, upon operating, opens contacts 211 to release pickup relay 200. Ground is not reapplied to conductor GPU when relay 200 releases by virtue of the fact that contacts 212 on relay 210 are now operated.

Returning to the gate adapter circuit 160, it can be seen that the operation of lamp control relay 250 opens break contacts 251 to release trunk relay 240. At contacts 241, relay 240 removes battery from the gate start conductor GST. Calls initiated on other lines or trunks at this time serve to operate the start relay 220 and thus open the first operating circuit for gating relay 210 at contacts 221. However, lockout relay 230 is held operated so long as any lamp control relays remain operated and at contacts 231 maintains the second operated path for relay 210.

In response to the illumination of incoming lamp L31, the operator at the operator's position 190 inserts plug P31 into jack J31. Sleeve relay 300 in trunk circuit 140 operates from ground through its upper high resistance winding and over sleeve conductors S2 and S3, the sleeve of jack J31 and plug P31, and through supervisory lamp L32 to battery. Sleeve assist relay 310 now operates from ground through operated make contacts 302 on relay 300. At break contacts 311, relay 310 removes battery from conductor L2 and thus releases lamp control relay 250 and extinguishes the incoming lamp L31. At contacts 314, relay 310 disconnects ringback tone from the line. The operator may now converse with the calling subscriber through the coupling capacitors C31 and C32.

When the calling party hangs up, calling bridge relay 320 releases responsive to the opening of the loop at the calling substation. At break contacts 323, relay 320 connects ground through operated make contacts 303 on relay 300, through the lower low resistance winding of relay 300 and over the sleeve conductor to illuminate supervisory lamp L32 and thus give the operator disconnect supervision. Ground is removed from sleeve conductor S1 at contacts 321 of relay 320 to release the preceding switches in the well known manner. After a slight interval, release delay relay 330 releases by virtue of the opening of contacts 322 on calling bridge relay 320. At its break contacts 332, relay 330 reconnects ground through operated contacts 301 on relay 300 to sleeve conductor S1 to mark the trunk circuit 140 as busy in the selector banks so long as the operator has not disconnected.

When the operator disconnects, battery through lamp L32 is removed from the sleeve, and sleeve relay 300 and sleeve assist relay 310 are thereby released. Ground is removed from sleeve conductor S1 and trunk circuit 140 is marked as idle in the selector banks.

If the operator should disconnect before the calling party hangs up, sleeve relay 300 releases but sleeve assist relay 310 remains operated over a circuit extending from ground through operated contacts 333 on relay 330 and through its operated contacts 313 and its winding to battery. Contacts 311 prevent the illumination of the incoming lamp and contacts 314 prevent the connection of ringback tone to the calling party.

Returning to the consideration of gate adapter control circuit 180, it can be seen that whenever gate cutoff key K21 is operated, battery is removed from gating relay 210, pickup relay 200, and lockout relay 230. With these relays released, ground, through break contacts 202 on relay 200 and now normal break contacts 212 on relay 210, is permanently connected to the gate pickup conductor GPU so that the lamp control relays in the gate adapter circuits are operated as soon as a call is initiated on their associated line. Thus the gating feature is effectively removed. Also, if fuse F21 should be blown by connection of ground to any of the common conductors GST, GB, or GLO, ground will be permanently connected to the gate pickup conductor GPU in like manner. In other words, the gating feature can be either manually or automatically removed without curtailing service from the associated lines or trunks.

While a specific embodiment of the invention has been shown and described, modifications thereto will readily occur to those skilled in the art. It is not desired that the invention be limited to the specific arrangement shown and described and it is intended in the appended claims to cover all modifications which fall within the spirit and scope of the invention.

What is claimed is:

1. In a telephone system, an operator's position, a plurality of lines terminating at said position, a plurality of incoming signal devices at said position individually corresponding to each of said lines, a plurality of gate adapter circuits individually associated with each of said lines, a gate adapter control circuit, a control relay in each gate adapter circuit, said control relay having first and second terminals, a first conductor extending from each line to the first terminal of the control relay in its associated gate adapter circuit, a first source of potential, means associated with each line for connecting said first source of potential to its associated first conductor when a call is initiated on said line, a second conductor extending from said gate adapted control circuit to all of said gate adapter circuits in multiple, means in each gate adapter circuit responsive to the connection of said first potential to said first conductor for connecting said second conductor to the second terminal of its control relay, a second source of potential, means in said gate adapter control circuit for intermittently connecting said second source of potential to said second conductor to thereby operate all control relays having said first source of potential connected to their respective first terminals, a third conductor connected between each of said gate adapter circuits and the signal device corresponding to the line associated with that gate adapter circuit, and means in each gate adapter circuit responsive to the operation of the control relay therein for energizing the signal device connected to said third conductor.

2. In a telephone system, an operator's position, a plurality of lines terminating at said position, a plurality of incoming signal devices at said position individually corresponding to each of said lines, a plurality of gate adapter circuits individually associated with each of said lines, a gate adapter control circuit, a control relay in each gate adapter circuit, said control relay having first and second terminals, a first conductor extending from each line to the first terminal of the control relay in its associated gate adapter circuit, a first source of potential, means associated with each line for connecting said first source of potential to its associated first conductor when a call is initiated on said line, a second conductor extending from said gate adapter control circuit to all of said gate adapter circuits in multiple, means in each gate adapter circuit responsive to the connection of said first potential to said first conductor for connecting said second conductor to the second terminal of its control relay, a second source of potential, means in said gate adapter control circuit for intermittently connecting said second source of potential to said second conductor to thereby operate all control relays having said first source of potential connected to their respective first terminals, a third conductor connected between each of said gate adapter circuits and the signal device corresponding to the line associated with that gate adapter circuit, means in each gate adapter circuit responsive to the operation of the control relay therein for energizing the signal device connected to said third conductor, means at said operator's position for performing an answering operation on each line having an energized signal device, and means associated with each line responsive to an answering operation performed on that line for disconnecting said first source of potential from said first conductor to thereby release the control relay associated with that line and deenergize the signal device corresponding to that line.

3. In a telephone system, an operator's position, a plurality of lines terminating at said position, a plurality of incoming signal devices at said position individually corresponding to each of said lines, a plurality of gate adapter circuits individually associated with each of said lines, a gate adapter control circuit, a control relay in each gate adapter circuit, said control relay having first and second terminals, a first conductor extending from each line to the first terminal of the control relay in its associated gate adapter circuit, a first source of potential, means associated with each line for connecting said first source of potential to its associated first conductor when a call is initiated on said line, a second conductor extending from said gate adapter control circuit to all of said gate adapter circuits in multiple, means in each gate adapter circuit responsive to the connection of said first potential to said first conductor for connecting said second conductor to the second terminal of its control relay, a second source of potential, means in said gate adapter control circuit operative to intermittently connect said second source of potential to said second conductor to thereby operate all control relays having said first source of potential connected to their respective first terminals, said last mentioned means being operated only when one or more lines have calls initiated thereon and when all control relays operated in response to a previous operation of said means have been released, a third conductor connected between each of said gate adapter circuits and the signal device corresponding to the line associated with that gate adapter circuit, means in each gate adapter circuit responsive to the operation of the control relay therein for energizing the signal device connected to said third conductor, means at said operator's position for performing an answering operation on each line having an energized signal device, and means associated with each line responsive to an answering operation performed on that line for disconnecting said first source of potential from said first conductor to thereby release the control relay associated with that line and deenergize the signal device corresponding to that line.

4. In a telephone system, an operator's position, a plurality of lines terminating at said position, a plurality of incoming signal devices individually associated with each of said lines, a plurality of control relays individually associated with each of said lines, means responsive to the operation of the control relay associated with any one of said lines for energizing the incoming signal device associated with that line, means at said operator's position for performing an answering operation on lines having energized signal devices, means associated with each of said lines responsive to an answering operation performed on said line for releasing the control relay associated with that line, means responsive to the initiation of a call on any one of said lines for preparing an operating circuit for the control relay associated with that line, a control circuit common to said control relays, a normally operated first relay in said control circuit, said first relay having first and second operating paths, means responsive to the initiation of a call on any one of said lines for opening said first operating path, a second relay in said control circuit, said second relay being operated so long as one or more of said control relays are operated and released when all of said control relays are released, means responsive to the release of said second relay for opening said second operating path, said first relay being released when both said first and second operating paths are opened, and means responsive to the release of said first relay for completing the operating circuits of all control relays having previously prepared operating circuits.

5. In a telephone system, an operator's position, a plurality of lines terminating at said position, a plurality of incoming signal devices individually associated with each of said lines, a plurality of control relays individually associated with each of said lines, means responsive to the operation of the control relay associated with any one of said lines for energizing the incoming signal device associated with that line, means at said operator's position for performing an answering operation on lines having energized signal devices, means associated with each of said lines responsive to an answering operation performed on said line for releasing the control relay associated with that line, means responsive to the initiation of a call on any one of said lines for preparing an operating circuit for the control relay associated with that line, a control circuit common to said control relays, a normally operated first relay in said control circuit, said first relay having first and second operating paths, means responsive to the initiation of a call on any one of said lines for opening said first operating path, a second relay in said control circuit, said second relay being operated so long as one or more of said control relays are operated and released when all of said control relays are released, means responsive to the release of said second relay for opening said second operating path, said first relay being released when both said first and second operating paths are opened, means responsive to the release of said first relay for completing the operating circuits of all control relays having previously prepared operating circuits, a cut-off key in said control circuit, and means responsive to the operation of said cut-off key for permanently releasing said first relay, whereby the operating circuit for any one of said control relays is completed when a call is initiated on the line associated with that control relay during the time that said cut-off key is operated.

References Cited in the file of this patent

UNITED STATES PATENTS

| | | |
|---|---|---|
| 2,249,486 | Molnar | July 15, 1941 |
| 2,291,497 | Newstedt | July 28, 1942 |
| 2,467,457 | Balzer | Apr. 19, 1949 |